2,663,269

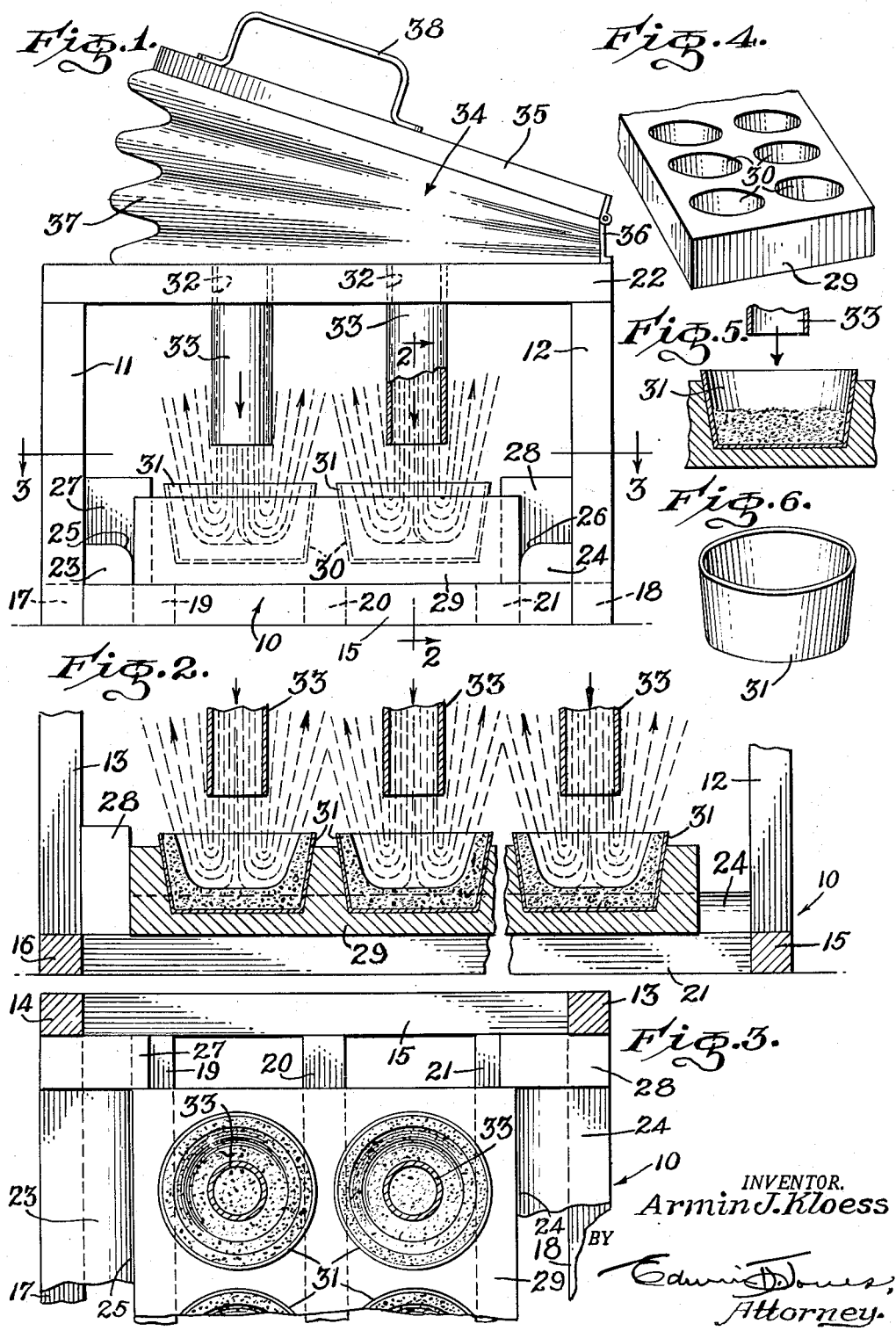
Dec. 22, 1953 — A. J. KLOESS — 2,663,269
METHOD FOR PRODUCING EDIBLE COATINGS FOR EDIBLE PRODUCTS
Filed Nov. 13, 1950
INVENTOR.
Armin J. Kloess Patented Dec. 22, 1953

UNITED STATES PATENT OFFICE 2,663,269

METHOD FOR PRODUCING EDIBLE COATINGS FOR EDIBLE PRODUCTS

Armin J. Kloess, Los Angeles, Calif.

Application November 13, 1950, Serial No. 195,214

2 Claims. (Cl. 107—54)

My invention relates to the preparation of food products of the kind in which an edible substance is used to form a coating for a different edible substance or substances.

A great variety of food products of the kind referred to are on the market, as for instance coated confections, cup cakes coated with icing and the like, in which the application of the coating involves dipping or spraying or otherwise applying the coating material by means of special equipment.

It is an object of my invention to provide an extremely simple, inexpensive, and highly effective method of an apparatus for preforming edible coatings for food products, the filling of the coating being subsequently placed in the coating in any suitable manner.

More specifically, it is an object of my invention to provide a method of producing edible coatings for edible products in which the coating is preformed by first reducing a solid edible substance to a liquid through the application of heat thereto, then pouring the liquid substance into suitably shaped containers, and finally directing a blast of a gaseous medium, such as air, at room temperature or lower, into the containers to force the melted coating substance to cover the inner sides and bottom of each container where, by the cooling action of the air, it is solidified into the form of a cup.

Another object of my invention is to provide apparatus by which coatings made by the method of my invention may be rapidly and easily produced.

A further object of my invention is to provide simple but efficient apparatus for producing coatings for food products such as confections, the coating being of different material from that of the filling.

Still further objects and features of my invention will appear from the following description read with reference to the accompanying drawings and which describe and illustrate an embodiment of the invention at present thought preferable by me.

In the accompanying drawings:

Fig. 1 is a view showing side elevation, and partly in section, of an apparatus of my invention by the use of which my novel method may be carried out.

Fig. 2 is an enlarged cross sectional view on the line 2—2 of Fig. 1, the upper portion of the apparatus being broken away.

Fig. 3 is a fragmentary cross sectional view on a larger scale and taken on the line 3—3 of Fig. 1.

Fig. 4 is a perspective view of a container holding member or block used in the apparatus.

Fig. 5 is a fragmentary cross section taken on the line 2—2 of Fig. 2 showing a quantity of coating material in the lower portion of a container therefor before commencement of the operation of distributing the material over the sides of the container;

Fig. 6 is a perspective view of a waxed paper cup in which the coating forming operation may be carried out.

Referring now to Figs. 1, 2 and 3 of the drawings, the numeral 10 indicates generally the frame of the apparatus which is rectangular in plan and elevation. The frame comprises vertical members 11, 12, 13 and 14 connected at their lower ends to cross members 15 and 16 and longitudinal members 17 and 18, constituting a base assembly. Extending longitudinally of the lower frame are rails 19, 20 and 21. The upper ends of the vertical members 11, 12, 13 and 14 are secured to a top frame member formed as a plate or platform 22.

Vertical members 11 and 12 with cross member 15 will be considered to constitute the front face of the apparatus. Extending from front to back on longitudinal members 17 and 18 are inwardly extending longitudinal guide strips 23, 24. The guide strips have their upper edges curved or rounded off as shown at 25 and 26, and projecting inwardly from the back end of the guide strips 23 and 24 are stop blocks 27, 28.

A tray 29 having a width accurately but removably fitting between the guides 23 and 24, is formed with two parallel rows of wells 30, there being three wells in each row in the present instance. The wells are slightly coned and of a depth to receive most of the depth of containers 31 of waxed paper or the like. The top plate 22 is formed with holes or ports 32 which, when the tray 29 is pushed back against the stops 27 and 28, are co-axially aligned with the ports 32 above each container 31 in its well in the tray. A conduit 33 is secured in each hole 32 in the top plate 22 and extends downwardly close to and above the top container 31 so as to be co-axial therewith.

Any suitable means for supplying air under pressure to the upper ends of the conduits 33 is provided, for instance as shown by means of a bellows 34 having an oscillatable top plate 35 hinged at 36 to top plate 22 and the pleated leather 37 secured in air tight relation between the periphery of the top plate 35 and the top plate 22.

It will be understood that the bellows are operated by actuation of a handle 38, but it is not necessary to provide the bellows with any valves but only the ports 32, since substantially the same air originally contained in the bellows can be circulated into and out of the conduits to produce the air blasts required for spreading of the coating substance within the containers. It will also be understood that rather than intermittent air blasts as produced by the bellows, continuous air blasts may be used by the provision of a source of constant air pressure.

To form a batch of coatings for confections or pastries, the container tray 29 being withdrawn from the apparatus, each of the wells 30 is fitted with a paper cup 31. It will be understood that other material than paper may be used for the cups, as for instance pastry containers used for ice cream. A sufficient quantity of melted edible coating substance which sets on cooling is now poured into each container to form a coating over the bottom and sides of the desired thickness when distributed thereover. The tray is then slipped into place in the apparatus with its rear edge abutting the stops 27 and 28 and its side edges guided by the lower portions of the faces of the side guides 23 and 24.

In this described position of the tray, each cup 31 will be positioned directly below the conduit 33 as shown in Fig. 5, the liquid layer being indicated at 39. The bellows are now operated to produce intermittent blasts of air, streams of which, by the conduits 33, are directed centrally into each cup, as indicated by the dash lines in Fig. 1. This results in forcing a part of the coat forming substance outwardly against and then upwardly of the sides of the cup to form a coating of substantially uniform thickness on both the sides and bottom of the cup. Since the air is at room temperature or lower, the coating of substance under continued subjection to the air blasts, becomes solidified to fix it in cup form as indicated at 40 in Fig. 2.

As aforestated the stream or blast of air can be continuous or intermittent, but in either case it is essential that the air be directed axially downward in the center of the cup in order that the coating substance be blown in part radially outward to the sides of the cup and then upwardly thereof. In this manner the coating substance is spread or distributed in the container to form a cup-shaped coating of substantially uniform thickness. An important feature of my invention is that there is no loss of the coating substance in the coat-forming operation since the cooling action of the air as it ascends along the sides of the cup solidifies the substance before it can be ejected from the cup.

The tray can now be withdrawn from the apparatus and the coated cups lifted out of the wells in the tray for subsequent filling with an appropriate edible substance to complete the food product.

While I have particularly described and illustrated in the drawings an embodiment of the invention which has performed well in practice, it is to be understood that various changes may be made in the steps of the process and in the described apparatus without departing from the scope of my invention as intended to be defined by the appended claims.

What I claim is:

1. A method of producing preformed edible coatings for edible products, comprising: depositing in the bottom of a cup-shaped container a melted coating substance in quantity to cover the bottom and sides of the container when spread; directing a stream of air downwardly through the top of the container and centrally thereof against the melted substance to distribute the latter substantially uniformly over the bottom and sides of the container, the temperature of the air stream being sufficiently low to solidify the substance before it can be ejected from the container by the air stream.

2. A method of producing preformed edible coatings for edible products, comprising: depositing on the bottom of a cup-shaped container a melted coating substance in quantity to cover the bottom and sides of the container when spread; directing a blast of air centrally downward into the container so that the air after striking the container is reversed in its direction of movement to pass upwardly out of the container, the downward movement of the air blast spreading the substance in part to the sides of the container, and the upward movement of the air blast spreading the substance over the sides of the container, thereby forming a coating of substantially uniform thickness within the container, the temperature of the air blast being sufficiently low to solidify the substance before the upward movement of the air blast can operate to eject the substance from the container.

ARMIN J. KLOESS.

References Cited in the file of this patent

UNITED STATES PATENTS

| Number | Name | Date |
|---|---|---|
| 927,435 | Sigrist | July 6, 1909 |
| 1,421,600 | Speck | July 4, 1922 |
| 1,451,031 | Speck | Apr. 10, 1923 |
| 1,492,738 | Muller | May 6, 1924 |
| 1,839,731 | Baum | Jan. 5, 1932 |